Patented Mar. 6, 1934

1,950,287

UNITED STATES PATENT OFFICE 1,950,287

METHOD OF PRODUCING WATER-SOLUBLE SUBSTANCES HAVING CAPILLARY-ACTIVE PROPERTIES AND THE PRODUCT

Ludwig Becker and Robert Müller, Dresden, Germany, assignors to Chemische Fabrik Pott & Co., Dresden, Germany No Drawing. Application February 1, 1929, Serial No. 336,909. Renewed August 1, 1933. In Germany November 27, 1928

16 Claims. (Cl. 260—159)

This invention relates to a method of producing water-soluble substances having capillary-active properties. Such substances are used in the industry for various purposes, for instance, as wetting-, emulsifying- or frothing-agents, or solvents.

It is accordingly, an object of this invention to provide a new process for preparing water-soluble substances having capillary-active properties.

It is a further object of this invention to form such capillary-active substances by energetic sulfonation processes.

Other and further important objects will become apparent from the following description and appended claims.

We have found that when polymerization products of lower hydrocarbons are subjected to sulfonation, preferably energetic sulfonation, substances are obtained, possessing properties adapting them for many different industrial uses, such as, wetting agents, emulsifying agents, foaming agents, or solvents. Such polymerization products may be obtained, for example, by treating alcohols having three or more carbon atoms, preferably secondary or tertiary alcohols, with strong condensing agents, such as, concentrated sulfuric acid, zinc chloride, aluminum chloride, or the like.

These products may also be obtained by passing the vapors of such alcohols over suitable contact substances whereby the polymerization products are obtained in the form of water-insoluble oils, in which the presence of hydroxyl-groups cannot be detected.

Furthermore, by treating the gaseous products from the so-called petroleum "cracking" process, which products generally consist of a mixture of various hydrocarbons, both saturated and unsaturated, with the above condensing agents, similar substances may be formed.

If the oily condensation products, obtained by any of the above methods, are energetically sulfonated, for instance, by treating them cold or moderately warm with concentrated sulfuric acid, fuming sulfuric acid, chloro-sulfonic acid or mixtures of these agents, with or without inert diluents, sulfonation products are obtained, which are water-soluble and which can be separated from the reaction mixture by known methods.

We have further found that substances of increased capillary-active properties are formed when the sulfonation of the above condensation products is performed either in the presence of or after a pretreatment at higher temperatures with anhydrides, chlorides or similarly reacting derivatives of the lower fatty acids; for instance, acetic anhydride, acetyl chloride, propionyl chloride or lactic anhydride, or the like.

These sulfonation products form viscous liquid masses. The masses as well as their alkali metal salts are water soluble and are stable to a considerable degree toward electrolytes. They are particularly resistant toward mineral acids, alkali metal salts and free alkalies, even in relatively high concentrations.

The most conspicuous property of these new products is their pronounced lowering of the surface tension of aqueous solutions which promotes their use in a large field of the technical arts. The possible application of the new substances are extremely varied. For instance, they can be used as wetting, frothing, or washing agents in the treating and refining of textiles; for converting liquid or solid substances, which per se are insoluble in water (such as hydrocarbons, higher alcohols, fats, oils, waxes, resins, pitches and pitchy substances), into clear solutions or fine, stable dispersions; for carbonizing; for dyeing in acid baths; for dyeing animal fibers with vat dyestuffs; for dyeing in alkaline, acid or neutral baths; for the pasting of dyestuffs; for fulling, sizing, impregnating and bleaching treatments; as cleansing agents in hard water; for dyeing in "padding" (impregnating) liquors; for dyeing with diazo preparations; in tanning and mordanting processes; as an aid to soap in acid baths; for dyeing acetate silk with insoluble dyestuffs; as emulsifying agents; as a resist (reserve) for cotton in acid baths; as an aid in dyeing and printing with aniline black; as an aid in desizing textile materials; for the preparation of azodyestuffs in finely divided form; as a fat decomposition agent for the removal of fats; for the cleansing of vegetable fibers; as an aid to the retting of flax; as an aid to mercerizing lyes; for producing foam in fire extinguishers; as a means for improving the absorptive power of fibrous bodies; as an aid in softening baths for hides and skins; as a disinfectant; as an insecticide; and for sulfonating oils and fats.

The following examples in which parts are given by weight serve to illustrate various embodiments of this invention.

Examples 1. 500 parts of tertiary butyl alcohol are mixed with 500 parts of concentrated sulfuric acid, while cooling. The mixture is then heated to water bath temperature. The reaction mixture separates into two layers, the lower of which consists purely of water-diluted but otherwise unchanged, sulfuric acid. This layer is separated from the upper, colorless, oily layer. About 370 parts of this oily layer are obtained which after a single washing with concentrated sulfuric acid is ready for further treatment. This treatment consists in mixing the oil with its own weight of carbon-tetra-chloride and an equal amount by weight of chloro-sulfonic acid while continuously cooling to room temperature. When the violent escape of hydrochloric acid gas has ceased, the reaction is complete. The reaction mass is heated for a short time and then diluted with an amount of water equal to the weight of the oily mass used. The unchanged lower layer of carbon-tetra-chloride is removed. The upper aqueous layer contains the formed sulfonation product in solution and may be used as such or in the form of its alkaline salt for any of the above named technical purposes.

2. The gases which escape during the cracking-distillation of North American petroleum are conducted through hot concentrated sulfuric acid and the non-absorbable saturated hydrocarbons allowed to escape. Finally a layer of the polymerization products of the unsaturated gases produced by the "cracking" separates on the surface of the sulfuric acid. This oily layer is subjected to an energetic sulfonation process according to Example 1.

3. 112 grams of the oil obtained from tertiary butyl alcohol (according to Example 1) are mixed with 102 grams of acetic acid anhydride. 200 grams of concentrated sulfuric acid are then added while thoroughly agitating and cooling the mixture. The reaction mass separates at the end of the reaction and the excess of sulfuric acid can be separated from the valuable reaction product in a separating column. The product obtained is a thick liquid, having a brownish red color, easily soluble in water as well as in the usual organic solvents. The product may be used as the free acid as well as in the form of its alkali salts.

We are aware that many changes may be made, and numerous details of the process may be varied through a wide range without departing from the principles of this invention, and we therefore do not purpose limiting the patent granted hereon, otherwise than necessitated by the prior art.

By the term "condensing agent" as used in the claims, we mean an agent capable of effecting both a dehydrating and a polymerizing action in our process such as sulphuric acid, zinc chloride, aluminum chloride and other customary condensing agents which are known to have a dehydrating action.

We claim as our invention:

1. Process of preparing capillary-active substances which comprises treating polymerized unsaturated aliphatic hydrocarbons containing non-aromatic polymers with a sulfonating agent.

2. Process of preparing capillary-active bodies which comprises treating polymerized hydrocarbons, obtainable by dehydrating and polymerizing aliphatic alcohols having at least three carbon atoms, with a sulfonating agent.

3. Process of preparing capillary-active bodies which comprises treating polymerized hydrocarbons, obtainable by dehydrating and polymerizing non-primary aliphatic alcohols, with a sulfonating agent.

4. Process of preparing capillary-active bodies which comprises sulfonating polymerized hydrocarbons, obtainable by treating tertiary aliphatic alcohols with a condensing agent.

5. Process of preparing capillary-active bodies, which comprises sulfonating the polymerized hydrocarbons obtainable by reacting tertiary butyl alcohol with a condensing agent.

6. Process of preparing capillary-active bodies which comprises sulfonating the polymerized hydrocarbons containing non-aromatic polymers obtainable by treating gaseous unsaturated aliphatic hydrocarbons with a condensing agent.

7. As new products, water soluble capillary-active bodies, comprising sulfonated non-aromatic polymerized unsaturated aliphatic hydrocarbons.

8. As new products, water soluble capillary-active bodies, comprising sulfonated polymerized hydrocarbons which may be formed by sulfonating reaction products of a tertiary aliphatic alcohol and a condensing agent.

9. As new products, water soluble capillary-active bodies comprising sulfonated non-aromatic polymerized hydrocarbons, which may be formed by sulfonating the hydrocarbons formed by treating gaseous unsaturated aliphatic hydrocarbons with a condensing agent.

10. The process of preparing capillary-active bodies which consists in dehydrating an aliphatic alcohol having three or more carbon atoms, polymerizing the dehydrated product and energetically sulfonating the polymerized condensation product thus obtained.

11. The process of preparing capillary-active bodies which consists in dehydrating an aliphatic alcohol having three or more carbon atoms, polymerizing the dehydrated product and energetically sulfonating the polymerized condensation product thus obtained by means of chloro-sulfonic acid in the presence of a diluent.

12. The process of preparing capillary-active bodies which consists in dehydrating tertiary butyl alcohol, polymerizing the dehydrated product and energetically sulfonating the polymerized condensation product thus obtained.

13. The process of preparing capillary-active substances which comprises treating polymerized unsaturated aliphatic hydrocarbons containing non-aromatic polymers with a sulfonating agent under energetic sulfonating conditions.

14. The process of preparing capillary-active substances which comprises treating polymerized unsaturated aliphatic hydrocarbons containing non-aromatic polymers with chloro-sulfonic acid.

15. The process of preparing capillary-active substances which comprises treating polymerized unsaturated aliphatic hydrocarbons containing non-aromatic polymers with a sulfonating agent and a substance selected from the group consisting of lower fatty acid anhydrides and lower fatty acid chlorides.

16. As new products, water-soluble capillary-active bodies obtainable by sulfonating polymerized cracked petroleum gases containing unsaturated aliphatic hydrocarbons.

LUDWIG BECKER.
ROBERT MÜLLER.